United States Patent [19]

Inaba

[11] 4,436,201
[45] Mar. 13, 1984

[54] DISC CARTRIDGE HAVING A DETACHABLE LID

[75] Inventor: Shosei Inaba, Sagamihara, Japan

[73] Assignee: Victor Company of Japan Limited, Yokohama, Japan

[21] Appl. No.: 440,158

[22] Filed: Nov. 8, 1982

[30] Foreign Application Priority Data

Nov. 11, 1981 [JP] Japan .................. 56-167141[U]
Nov. 19, 1981 [JP] Japan .................. 56-171455[U]

[51] Int. Cl.³ .................. B65D 85/30; B65D 85/57; F16F 1/22
[52] U.S. Cl. .................. 206/444; 206/312; 206/1.5; 24/338; 24/614; 267/165; 292/DIG. 38
[58] Field of Search .............. 206/444, 309, 312, 1.5; 292/86, DIG. 38; 24/201 TR, 255 BS, 255 SL, 338; 267/144, 165

[56] References Cited

U.S. PATENT DOCUMENTS

| 2,363,837 | 11/1944 | Daugherty | 267/165 |
| 2,855,632 | 10/1958 | Croce et al. | 267/165 |
| 4,159,827 | 7/1979 | Torrington | 206/444 |
| 4,164,782 | 8/1979 | Stewart | 206/444 |
| 4,262,718 | 4/1981 | Stark | 24/201 TR |
| 4,266,784 | 5/1981 | Torrington | 206/444 |
| 4,325,526 | 4/1982 | Kiragawa | 24/255 SL |

FOREIGN PATENT DOCUMENTS

| 2222875 | 10/1974 | France | 292/DIG. 38 |
| 2084691 | 4/1982 | United Kingdom | 267/165 |

*Primary Examiner*—William T. Dixson, Jr.
*Assistant Examiner*—Brenda J. Ehrhardt
*Attorney, Agent, or Firm*—Pollock, Vande Sande & Priddy

[57] ABSTRACT

A disc cartridge for containing therein an information recording disc, such as a video disc, has a detachable lid which is engaged with an opening of said cartridge. The lid has a pair of engaging means which are integrally formed with the lid body by a synthetic resin. Each of the engaging means comprises a curved lock arm having a projection to be received in a recess made in a cartridge body, and is connected to the end of the lid body at its one end. A plurality of leaf spring elements constitute a zigzag-shaped spring member which is interposed between one end of the lid body and the lock arm. Some of the leaf spring elements have thin and thick portions so that stress applied thereto will be dispersed. In one embodiment, the dimension of the thick portions is selected so that the thick portion abuts against an adjacent leaf spring when the zigzag-shaped spring member is compressed.

8 Claims, 11 Drawing Figures

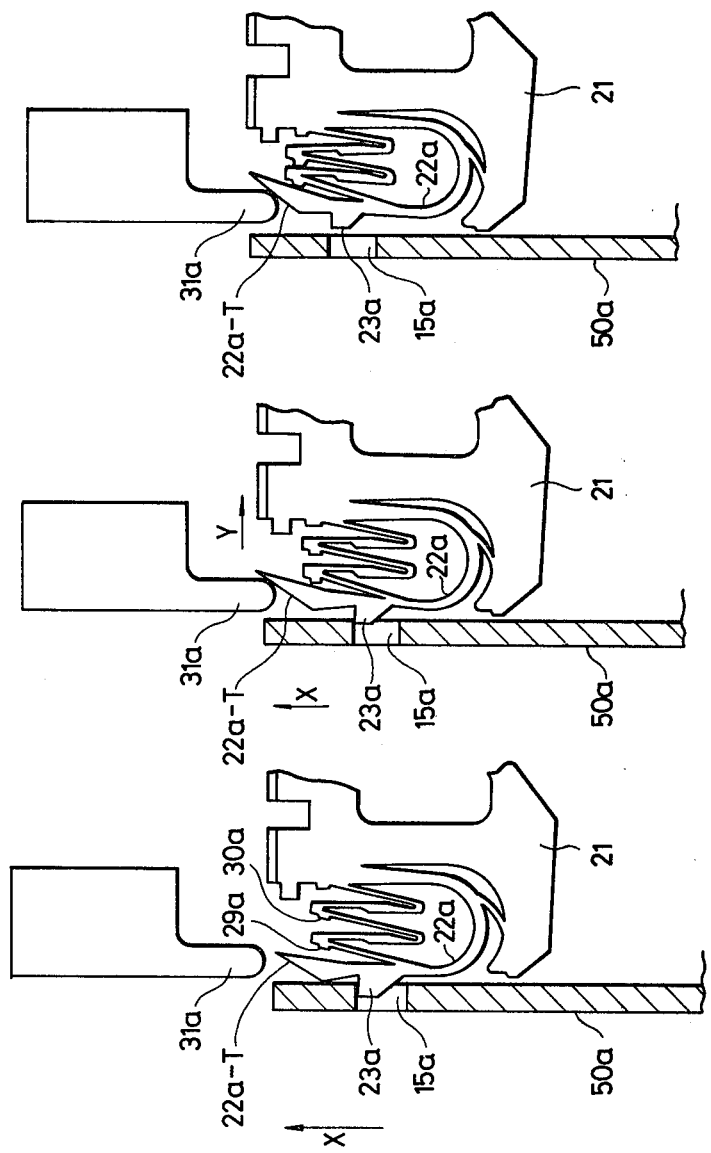

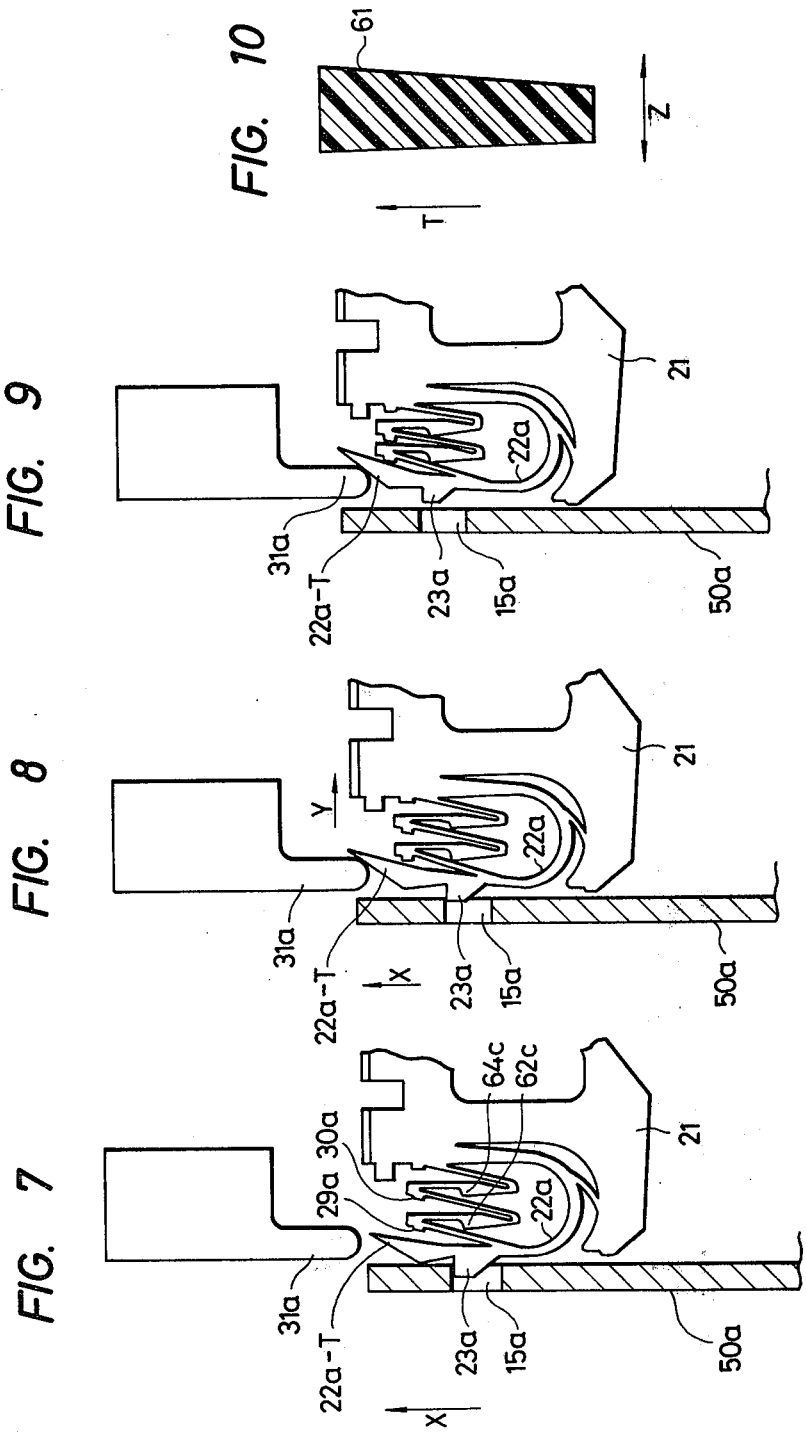

DISC CARTRIDGE HAVING A DETACHABLE LID

BACKGROUND OF THE INVENTION

This invention relates generally to a cartridge or a casing for containing an information recording disc, such as a video and/or audio disc, and more particularly, the present invention relates to the structure of a lock arm provided to a detachable lid of such a disc cartridge.

Various types of information recording discs carrying video and/or audio signals are known. Although discs of the type arranged to be treated without being covered by a suitable container are known, there is another type of discs which are contained in a suitable container. Each container contains a single disc therein, and is inserted into a reproducing apparatus or player so that only the disc is left in the apparatus and the container is pushed out. In order that the disc kept in the container is taken out within the reproducing apparatus, the container has an opening at one end which is covered by a detachable lid. Since the disc container is inserted into the reproducing apparatus to place the disc at a given position in the apparatus, the container is referred to as a disc cartridge. After playback, the empty cartridge is again inserted into the reproducing apparatus so that the disc is again kept in the cartridge, and then the cartridge is taken out either automatically or manually.

In order that the disc in the cartridge inserted into the reproducing apparatus is automatically taken out of the cartridge, the lid of the cartridge has two lock arms at both ends thereof. Each of the lock arms has a projection arranged to engage a recess provided to the cartridge body so that the lid is normally connected to the cartridge body. When the cartridge is inserted into the reproducing apparatus, the lock arm is pressed by a stationary member in the reproducing apparatus to disengage from the recess. Thus the lid is separated from the cartridge body, and then the cartridge body is pressed backward with the disc being held by a suitable supporting member of the reproducing apparatus. As a result, the lid and the disc remain in the reproducing apparatus, while the cartridge body is ejected.

Both the cartridge body and the lid are made of a synthetic resin. Although it is preferable that the lock arms provided to the lid are also made of the same synthetic resin to be integral with the lid body in view of cost reduction, it has been difficult to integrally form the lock arms with the lid body because of the following reasons. When each of the lock arms is made of a synthetic resin, the lock arm has a given shape to show elasticity so that it moves between two positions for engagement and disengagement. However, since the cartridge is loaded and unloaded many times or when the lock arm is continuously compressed for a long period of time in the reproducing apparatus, the elasticity or characteristic of spring of the lock arm is apt to deteriorate. Furthermore, application of heavy stress is apt to result in permanent strain and/or blushing, i.e. a phenomena in which a portion of the synthetic resin turns white due to application of stress beyond the limit of elasticity.

If the lock arm does not return to its original position, the projection thereof is difficult to engage the recess of the cartridge body, resulting in a problem that only the cartridge body is ejected leaving the lid in the reproducing apparatus with the disc being particially received in the cartridge body even if it is intended to eject the lid together with the cartridge body after playback. For this reason, the lock arms are made of metallic leaf springs in known disc cartridges. Namely, a pair of lock arms each made of a leaf spring, are attached to given positions of the lid body. However, it is time-consuming and troublesome to attach such metallic lock arms to the lid body.

SUMMARY OF THE INVENTION

The present invention has been developed in order to remove the above-described drawbacks inherent to the conventional disc cartridge.

It is, therefore, an object of the present invention to provide a new and useful disc cartridge which can be used for a long time without suffering from a problem in connection in deterioration in elasticity of synthetic resin-made engaging means provided to a detachable lid of the disc cartridge.

According to a feature of the present invention the engaging means provided to both ends of the detachable lid of the disc casing comprises a generally U-shaped or curved lock arm and a zigzag-shaped spring member having a plurality of leaf spring elements, where the thickness of the leaf spring elements is selected so that stress occurring when the zigzag-shaped spring member is compressed, is dispersed. Suitable projections are provided to some or all leaf spring elements so that each leaf spring element as well as the lock arm deforms within their limit of elasticity.

In accordance with the present invention there is provided a disc cartridge for containing an information recording disc therein, comprising: a cartridge body having an opening at one end thereof for inserting and taking out a recording disc therethrough; a lid detachably engaged with the end for covering the opening when engaged with the cartridge body, the lid having a lid body and a pair of engaging means provided at both ends of the lid body for the engagement of the lid with the cartridge body, the lid body and the engaging means being integrally formed of a synthetic resin; the engaging means having a lock arm having a curved portion, one end of the lock arm being connected to the lid body, a projection, which will be received in a recess made in the cartridge body, being provided in the vicinity of the other end of the lock arm; a plurality of leaf spring elements constituting a generally zigzag-shaped spring means, which is interposed between one end of the lid body and the lock arm, each of the leaf spring elements being connected to another at its end to form consecutive V-shapes, every other leaf spring element in the zigzag-shaped spring means has a thin portion and a thick portion.

BRIEF DESCRIPTION OF THE DRAWINGS

The object and features of the present invention will become more readily apparent from the following detailed description of the preferred embodiments taken in conjunction with the accompanying drawings in which:

FIGS. 4 to 6 are explanatory diagrams for the description of the operation of the engaging means;

FIGS. 7 to 9 are explanatory enlarged views showing another embodiment of the present invention; abd FIG. 10 is a cross-sectional view of the leaf spring element of FIG. 3B taken along the line X—X.

The same or corresponding elements and parts are designated at like reference numerals throughout the drawings.

DETAILED DESCRIPTION OF THE INVENTION

Figure 1:
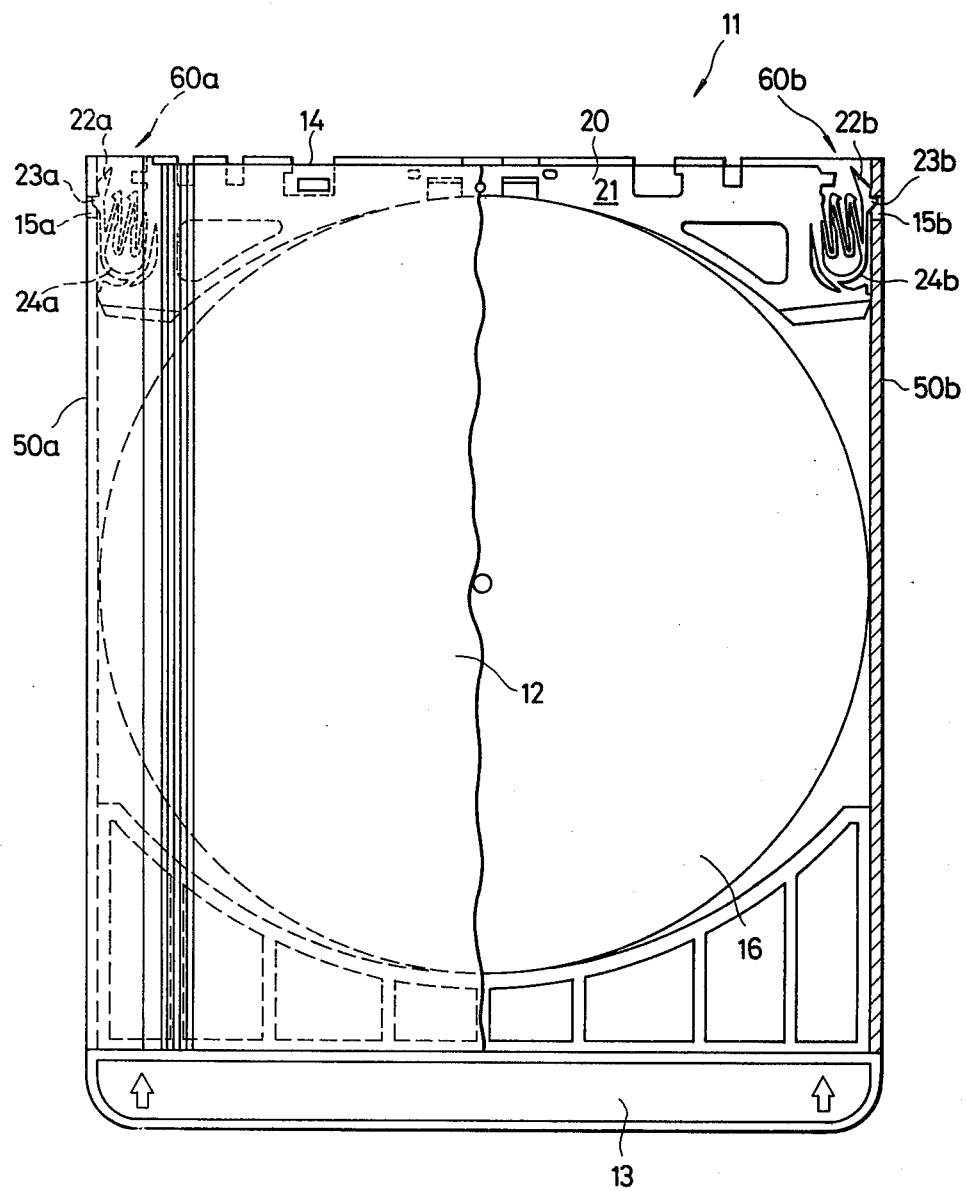
FIG. 1 is a schematic top plan/cross-sectional view of a disc cartridge according to the present invention.

Referring now to FIG. 1, a schematic diagram of the disc cartridge according to the present invention is shown. The left half of the disc cartridge is shown by way of a top plan view, and the right half is shown by way of a cross-sectional view. The disc cartridge, which is generally designated at 11, comprises a cartridge body 12, a rear lid 13 and a front lid 20. The cartridge body 12 has a flat bore for containing an information disc 16, such as a video disc. In detail, the cartridge body 12 is made by cutting an extruded endless sleeve to a desired length. Therefore, the cartridge body 12 has front and rear openings when produced. To the rear opening is fitted the rear lid 13. The rear lid 13 is fixedly attached to the rear portion of the cartridge body 12 with a portion thereof inserted into the rear opening. The front lid 20 is detachably engaged with the front opening 14 so that the disc 16 can be taken out and inserted in through the front opening 14.

The side portions of the cartridge body 12 are referred to as side edges 50a and 50b. Through-holes or recesses 15a and 15b are respectively made in the side edges 50a and 50b in the vicinity of the front opening 14. These through-holes 15a and 15b will be used for the engagement of the front lid 20 with the cartridge body 12 as will be described later.

The front lid 20 is shown to be inserted through the front opening 14 into the bore of the cartridge body 12 so that the front opening 14 is closed or covered. A pair of engaging means 60a and 60b are provided to both ends, i.e. right and left ends, of the front lid 20. As described in the above, since the rear lid 13 is not movable or detachable, the term "lid" will be used to indicate only the front lid 20 hereafter. Although the engaging means 60a and 60b are actually parts of the lid 20, the portion of the lid 20 other than the engaging means 60a and 60b is referred to as a lid body 21 hereafter for making clear the relationship between the engaging means 60a and 60b and the lid 20.

Figure 2:
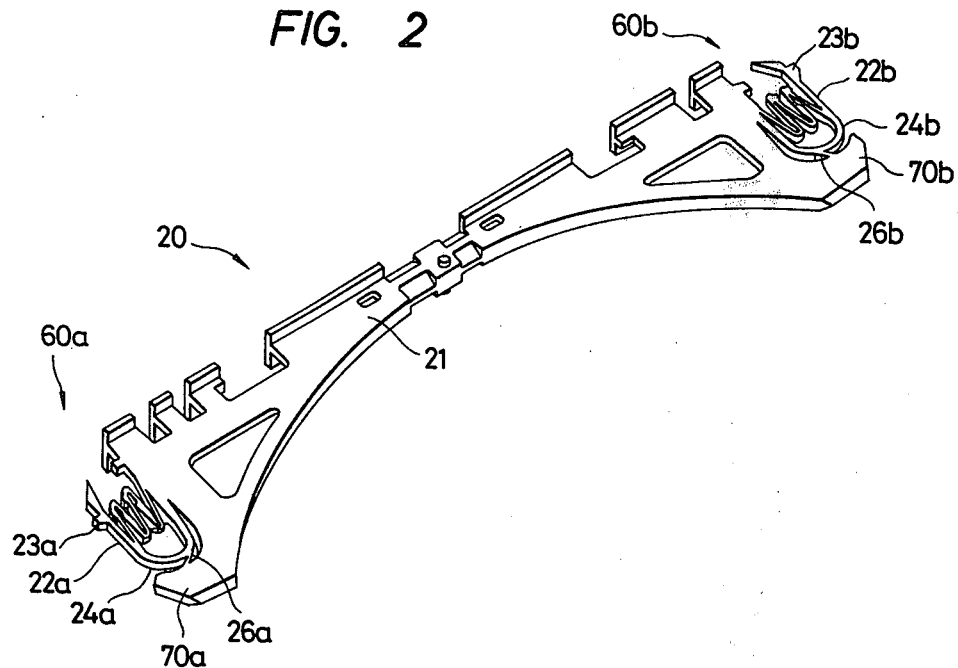
FIG. 2 is a perspective view of the lid of the cartridge of FIG. 1.

The structure of the engaging means 60a and 60b will be described in detail with reference to FIGS. 2, 3A and 3B. Since the pair of engaging means 60a and 60b have identical and symmetrical structure, description is made on one of them. The engaging means 60a at the left of the lid body 21 comprises a generally U-shaped lock arm 22a which extends from the left end of the lid body 21 (the other engaging means 60b comprises a similar lock arm 22b extending from the right end of the lid body 21). In detail, the U-shaped lock arm 22a comprises a substantially parallel straight portions 22a-S1 and 22a-S2, and a curved portion 24a bridging across the straight portions 22a-S1 and 22a-S2. The right straight portion 22a-S2 is connected to the left end of the lid body 21 at its one end, while the other straight portion 22a-S1 has a projection 23a on the outer or left side surface therof. This projection 23a has such a dimension that it can be received in the above-mentioned through-hole 15a made in the left side edge 50a of the cartridge body 12. A generally zigzag-shaped spring means 22a-W is interposed between the parallel straight portins 22a-S1 and 22a-S2. The zigzag-shaped spring means 22a-W comprises a plurality of generally straight leaf spring elements 61, 62, 63, 64 and 65 which are connected one after another in a zigzag manner. In other words, any two consecutive elements constitute a V-shaped member so that the first to fourth leaf spring elements 61 to 64 constitute a W-shaped member and the second or fifth leaf spring elements 62 to 65 constitute another W-shaped member.

The lid body 21 has tails 70a and 70b which respectively extend outwardly from the left and right ends thereof. The left tail 70a extends substantially parallel to the straight portion 22a-S2 and the curved portion 24a along the same with a space from the outside surface of the U-shaped lock arm 22a. The curved portion 24a is connected via connecting member 26a to the tail 70a. The connecting member 26a is also curved and is provided such that it has an inclination angle with respect to the parallel straight portions 22a-S1 and 22a-S2. In other words, the connecting member 26a is not parallel to the straight portions 22a-S1 and 22a-S2, and extends from the U-shaped lock arm 22a to the tail 70a in a direction in which it goes close to the left straight portion 22a-S1.

The first and third leaf spring elements 61 and 63 which constitute the zigzag-shaped spring member 22a-W has respectively projections 29a and 30a in the vicinity of their upper ends at which the first and third leaf spring elements 61 and 63 are respectively connected to the second and fourth elements 62 and 64. These projections 29a and 30a are provided on the left side of the first and third leaf spring elements 61 and 63 so that the first projection 29a can be in contact with the inner or right side of the left straight portion 22a-S1, and the second projection 30a can be in contact with the inner or right side of the second leaf spring element 62 when the left straight portion 22a-S1 is inwardly pressed as will be described later.

Figure 3A:
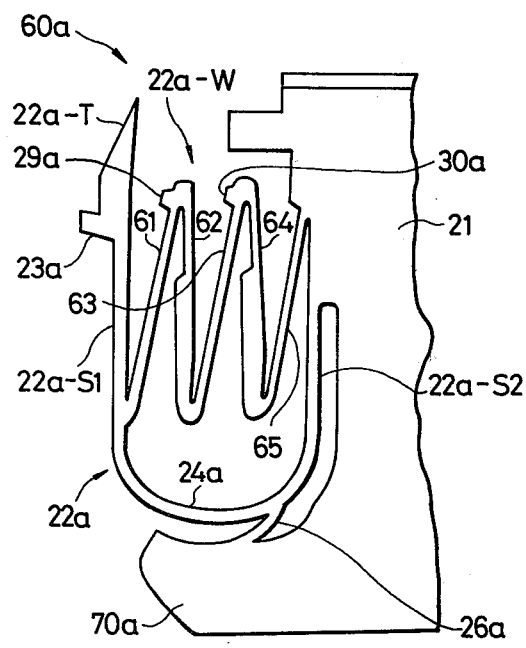
FIGS. 3A and 3B are an enlarged view of the engaging means provided to the lid of FIG. 2, and an enlarged view of the spring member of the engaging means.

As best seen in an enlarged view of FIG. 3A, each of the second and fourth leaf spring elements 62 and 64 has a thin portion 62U (64U) and a thick portion 62L (64L). The thickness of the thin portion 62U (64U) is preferably the same as the thickness of the first, third and fifth leaf spring elements 61, 63 and 65. Here, the terms "thin" and "thick" are used to indicate the size of the leaf spring elements 61 to 65 measured in a direction in which the zigzag-shaped spring means 22a-W is to be compressed. The thin portion 62U (64U) is located close to the first leaf spring element 61, and the thick portion 62L is located close to the third leaf spring element 63. Namely, in the illustrated arrangement, the second leaf spring element 62 has an upper thin portion 62U and a lower thick portion 62L. The length of the thin portion 62U is preferably selected so that is occupies between 30 and 50 percent of the entire length of the second leaf spring element 62. The fourth leaf spring element 64 has substantially same structure as the second leaf spring element 62, and detailed description thereof is omitted.

The engaging means 60a including the above mentioned U-shaped lock arm 22a, zigzag-shaped spring means 22a-W, connecting member 26a, is integrally formed with the lid body 21. The lid 20 is made of a synthetic resin so that the engaging means 60a and 60b can be integrally formed with the lid body 21. Namely, the lid 20 is formed by one of well known plastic molding techniques, such as injection molding. Various kinds of synthetic resins may be used as long as it has a sufficient impact strength and tensile strength and a high heat distortion temperature. Preferably, the heat distortion temperature is above 130 degrees centigrade. As such a synthetic is preferably used a thermoplastic aromatic polyester resin, known as Upolymer (trademark) produced by Unitika Ltd, polycarbonate added with glass fiber, or polysulophone.

The disc cartridge 11 according to the present invention will be used as follows. Let us asssume that the disc cartridge 11 having a disc 16 therein is inserted or loaded into an unshown reproducing apparatus. At this time the lid 20 is engaged with the front opening 14 as shown in FIG. 1. The operation of the engaging means 60a and 60b will be described with reference to FIGS. 4, 5 and 6.

The projection 23a provided at the outer surface of the left straight portion 22a-S1 of the U-shaped lock arm 22a is shown to be received in the through-hole 15a of the left side edge 50a. Because of the elasticity of the engaging means 60a the left straight portion 22a-S1 is outwardly biased, namely in the direction toward the left side edge 50a. Therefore, the projection 23a is securely received in the through-hole 15a for preventing the lid 20 from being disengaged. As the disc cartridge 11 is further inserted into the reproducing apparatus, the outer tip 22a-T portion of the left straight portion 22a-S1 abuts against a stationary member 31a of the reproducing apparatus. The stationary member 31a is projected to be in contact with only the outer tip portion 22a-T of the left straight portion 22a-S1. The outer tip 22a-T of the left straight portion 22a-S1 is oblique in such a manner that the tip or open end is pointed, and the stationary member 31a will come into contact with this oblique outer tip 22a-T. As the disc cartridge 11 is further moved forward, i.e. in the direction of an arrow X in FIGS. 4 and 5, the left straight portion 22a-S1 is biased inward as indicated by an arrow Y against the force of the elasticity of the engaging means 60a. Therefore, at the time that the disc cartridge 11 is fully inserted, the projection 23a is disengaged from the through-hole 15a, as shown in FIG. 5, because the left straight portion 22a-S1 is biased for a distance greater than the height of the projection 23a. Thus the lid 20 is free from the cartridge body 12 and is detached from the cartridge body 12.

The movement or displacement of the various elements of the engaging means 60a will be further described in detail with reference to FIGS. 4 to 6. When the outer tip 22a-T of the left straight portion 22a-S1 is first in contact with the staionary member 31a, the lock arm 22a deforms due to the elasticity of the lock arm 22a per se. Namely, the left straight portion 22a-S1 moves inward, i.e. in the direction of an arrow Y. Because of the displacement of the left straight portion 22a-S1 the zigzag-shaped spring means 22a-W is compressed so that first to fifth leaf spring elements 61 to 65 are deformed and moved inward. However, the amount of displacement of these leaf spring elements 61 to 65 is not uniform throughout all. Since stress is applied from the left straight portion 22a-S1, the displacement of the first leaf spring element 61 placed at the left end is the greatest and the displacement of the fifth leaf spring 65 placed at the right end is the smallest. As the lock arm 22a deforms to assume a state of FIG. 5, the inner or right surface of the left straight portion 22a-S1 abuts against the projection 29a provided on the left side of the first leaf spring element 61 because the displacement of the left straight portion 22a-S1 is greater than that of the first leaf spring element 61. Therefore, the first leaf spring element 61 is further deformed and moved to cause the second leaf spring element 62 to be deformed and moved. Then the second leaf spring element 62 comes into contact with the projection 30a of the third leaf spring element 63. As a result, the third and fourth leaf spring elements 63 an 64 are further deformed and moved in turn. In this way, displacement of the first to fifth leaf spring elements 61, 62, 63, 64 and 65 is occured in waves in a direction from the first leaf spring element 61 to the fifth leaf spring element 65. From the above it will be understood that when a leaf spring element closer to the left straight portion 22a-S1 is deformed and moved inward by a given distance, a subsequent leaf spring element is then deformed and moved inward to perform chain displacement resulting in compression of the zigzag-shaped spring means 22a-W. As a result, each leaf spring element 61-65 constituting the zigzag-shaped spring means 22a-W as well as the lock arm 22a is only deformed within its limit of elasticity because of the presence of the projections 29a and 30a. Therefore, elasticity of the engaging means 60a is not lost even if engagement and disengagement of the lid 20 is repeatedly effected or the lock arm 22a is continuously pressed inward for a long period of time.

It is to be noted that the upper portion 62U and 64U of each of the second and fourth leaf spring elements 62 and 64 is thiner than the lower portion thereof 62L and 64L as described with reference to FIG. 3B. Namely, in the preferred embodiment the thickness of the upper portion 62U (64U) is substantially the same as the thickness of the remaining leaf spring elements 61, 63 and 65. As a result stress occurring when the zigzag-shaped spring means 22a-W deforms does not concentrate on the second and fourth leaf spring elements 62 and 64 to be dispersed. Since concentration of stress on certain points in the zigzag-shaped spring means 22a-W is avoided, the zigzag-shaped spring means 22a-W is smoothly deformed due to the displacement of the lock arm 22a. Accordingly, the movement of the lock arm 22a is also smooth and natural. Therefore, the engaging means 60a is hardly cracked and the elasticity is hardly deteriorated to provide a remarkable durability in recoil movement.

In the above-described embodiment, each of the second and fourth leaf spring elements 62 and 64 has an upper thin portion 62U (64U) and a lower thick portion 62L (64L), and the thickness of the lower thick portion 62L (64L) is selected so that it does not come into contact with a left adjacent leaf spring element. However, the thickness of the lower thick portion 62L (64L) may be selected so that the lower thick portion 62L (64L) comes into contact with a left adjacent leaf spring element.

Hence, reference is now made to FIGS. 7 to 9 which show a modification of the above-described embodiment. This modification differs from the above embodiment in that the thickness of the lower thick portion 62L (64L) is selected so that the second leaf spring element 62 comes into contact with the first leaf spring element 61 when the first leaf spring element 61 moves right, and the fourth leaf spring element 64 comes into contact with the third leaf spring element 63 when the third leaf spring element 63 moves right. In detail, the lower thick portion 62L (64L) is generally wedged in such a manner that the thickness of the thick portion decreases toward the lower end. Thus the upper end of the lower thick portion 62L (64L) has a corner 62C (64C) portion at which the thickness is the greatest.

The modified embodiment of FIGS. 7 to 9 operates as follows. When the outer tip 22a-T of the left straight portion 22a-S1 of the U-shaped lock arm 22a is pressed inward, the left straight portion 22a-S1 deforms and moves right so that the inside surface therof comes into contact with the projection 29a. Thus the first leaf spring element 61 is deformed and moved right until the right side of the same abuts against the corner 62C of the lower thick portion 62L of the second leaf spring element 62 to move the second leaf spring element 62 right. In this way the third, fourth and fifth leaf spring elements 63, 64 and 65 are deformed and moved right one after another.

In the above embodiments, although it has been described that the lock arm 22a is generally U-shaped, other shape of lock arms may be used. Turning back to FIG. 3A, since the lock arm 22a is connected to the tail 70a of the lid body 21 by means of the connecting member 26a, the right straight portion 22a-S2 of the U-shaped lock arm 22a does not very much contribute to spring function. Therefore, the right straight portion 22a-S2 may be directly connected to the lid body 21 along its right side. In other words, a recess defined by the right side of the straight portion 22a-S2, the connecting member 26 and the lid body 21 may be omitted and filled with the same resin. In this case, the lock arm 22a extends from the tail 70a of the lid body 21, where the shape of the lock arm 22a is not of U-shape any more.

The lid 20 having the lid body 21 and the pair of engaging means 60a and 60b may be produced by a suitable synthetic resin molding technique as described hereinabove, and in order that the molded product can be readily taken out of the mold, the engaging means 60a and 60b may be tapered in a direction perpendicular to the movement of the engaging means 60a and 60b.

Figure 3B:
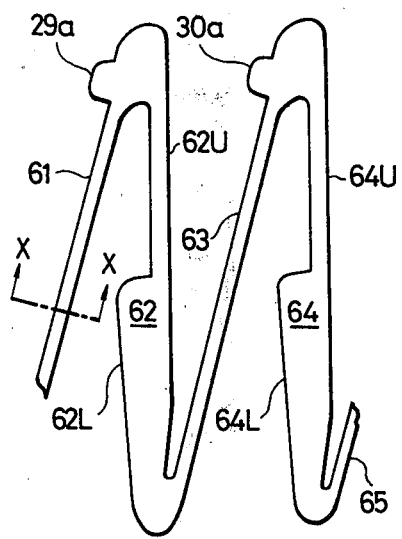

FIG. 10 shows a cross-sectional view of the leaf spring 61 of FIG. 3B taken along the line X—X. An arrowed line Z indicates the direction of the movement of the engaging means 60a, and another arrow T indicates the direction in which the molded product is taken out of an unshown mold.

From the foregoing, it will be understood that the synthetic resin made engaging means provided to both ends of the detachable lid of the disc cartridge shows a sufficient spring characteristic which is difficult to deteriorate for a long time use. Therefore, recoil movement of the engaging means is ensured so that the lid is engageable with the cartridge body whenever the cartridge body is inserted into the reproducing apparatus to take the disc and the lid out of the reproducing apparatus. The above-described embodiments are just examples of the present invention, and therefore, it will be apparent for those skilled in the art that many modifications and variations may be made without departing from the spirit of the present invention.

What is claimed is:

1. A disc cartridge for containing an information recording disc therein, comprising:
    (a) a cartridge body having an opening at one end thereof for inserting and taking out a recording disc therethrough;
    (b) a lid detachably engaged with said end for covering said opening when engaged with said cartridge body, said lid having a lid body and a pair of engaging means provided at both ends of said lid body for the engagement of said lid with said cartridge body, said lid body and said engaging means being integrally formed of a synthetic resin;
    said engaging means having;
        a lock arm having a curved portion, one end of said lock arm being connected to said lid body, a projection, which will be received in a recess made in said cartridge body, being provided in the vicinity of the other end of said lock arm;
        a plurality of leaf spring elements constituting a generally zigzag-shaped spring means, which is interposed between one end of said lid body and said lock arm, each of said leaf spring elements being connected to another at its end to form consecutive V-shapes, every other leaf spring element in said zigzag-shaped spring means has a thin portion and a thick portion.

2. A disc cartridge as claimed in claim 1, wherein said thin portion is provided close to one end of each of said every other leaf springs, which end is positioned outside the other end viewed from said lid body.

3. A disc cartridge as claimed in claim 2, wherein the dimension of said thick portion is selected so that each leaf spring positioned immediately outside each of said every other leaf spring abuts against said thick portion when the first mentioned leaf spring is deformed and moved inward.

4. A disc cartridge as claimed in claim 1, wherein at least one of said leaf springs other than said every other leaf spring comprises a projection extending outwardly.

5. A disc cartridge as claimed in claim 1, wherein said engaging means is tapered in a direction perpendicular to the movement of said engaging means so that said lid can be readily taken out of a mold after synthetic resin molding is completed.

6. A disc cartridge as claimed in claim 1, wherein said curved lock arm is generally U-shaped, and is connected to said lid body at not only one end of said U-shaped lock arm but also at a curved portion interposed between two parallel straight portions.

7. A disc cartridge as claimed in claim 1, wherein the number of said leaf springs is five.

8. A disc cartridge as claimed in claim 1, wherein said synthetic resin is a thermoplastic aromatic polyester resin, polycarbonate added with glass fiber, or polysulophone.

* * * * *